United States Patent [19]

Penizotto et al.

[11] 4,078,396
[45] Mar. 14, 1978

[54] CLIP AND SCREW FASTENING MECHANISM

[75] Inventors: Peter Penizotto, Syracuse; Theodore E. Bolton, Liverpool, both of N.Y.

[73] Assignee: Carrier Corporation, Syracuse, N.Y.

[21] Appl. No.: 766,398

[22] Filed: Feb. 7, 1977

[51] Int. Cl.² .................. F25D 19/00; A47B 77/08; A47F 3/04
[52] U.S. Cl. ...................... 62/298; 165/76; 312/236
[58] Field of Search ............... 62/291, 298; 312/236; 165/76

[56] References Cited
U.S. PATENT DOCUMENTS

| | | | |
|---|---|---|---|
| 3,357,763 | 12/1967 | Toper | 62/291 |
| 3,624,703 | 11/1971 | Panek | 62/298 |
| 3,823,770 | 7/1974 | Duell et al. | 62/298 |
| 3,827,775 | 8/1974 | Arrogante | 312/236 |
| 4,005,746 | 2/1977 | Young | 165/76 |

Primary Examiner—Lloyd L. King
Attorney, Agent, or Firm—J. Raymond Curtin; Robert P. Hayter

[57] ABSTRACT

A mechanism for fastening two items together where one item has an opening which includes a clip having legs formed thereon and a screw. The legs of the clip have flanges which converge to form triangular shaped ends of the legs for guiding the legs into the opening in the first item. The screw is then inserted thru the second item into the clip whereby the clip is expanded locking the legs onto the material surrounding the opening in the first item and fastening the clip to the second item.

4 Claims, 5 Drawing Figures

CLIP AND SCREW FASTENING MECHANISM

BACKGROUND OF THE INVENTION

The present invention relates to fastening devices in an air conditioner. More specifically, the present invention relates to apparatus for joining a flangeless end plate of a heat transfer coil in an air conditioner to the base pan thereof.

In air conditioning units and particularly self contained air conditioning units such as a window or through-the-wall units, the air conditioner is divided into an evaporator section and a condenser section by a partition. An evaporator consisting of a finned tube heat exchanger is mounted to the base pan of the unit in the evaporator section and a condenser also consisting of a finned tube heat exchanger is mounted in the evaporator section to the base pan.

Previously, finned tube heat exchangers, such as the evaporator or condenser in an air conditioner, were constructed with copper tubes; however, with the advent of new technology, it has been possible to construct heat exchangers with aluminum tubes. The heat exchangers are assembled by inserting a plurality of tubes through openings in pre-stamped fins. End plates are then attached to hold the heat exchanger together. The final assembly step is to bond semicircular shaped return tubes to the open ends of the tubes mounted in the heat exchanger thereby providing for circular flow thru the heat exchanger.

A method being used to connect the semicircular shaped aluminum tubes to the tubes in the heat exchanger is to bond the tubes together by an ultrasonic dip process in which the end of the heat exchanger containing the joints to be bonded is dipped into an ultrasonically excited molten bath containing a zinc-aluminum alloy.

Prior to the ultrasonic dip process, the end plates had flanges at right angles to the face of the end plate. The flanges were then simply connected directly to the base pan to mount the heat exchanger. However, the end plate flanges extended beyond the end plate as did the semicircular shaped tubes. Therefore in the ultrasonic dip process the flanges interfered with the bonding of the semicircular tubes with the straight tubes and it bacame necessary, as well as less expensive, to fasten the end plate to the base pan without the use of flanges.

SUMMARY OF THE INVENTION

An object of the present invention is to effectively and economically fasten in an air conditioning unit a heat transfer coil or heat exchanger to a base pan.

A more specific object of the present invention is to fasten in an air conditioning unit a flangeless heat exchanger to a base pan and to thermally insulate the heat exchanger from the base pan.

A still further object of the present invention is to provide apparatus for fastening a flangeless heat exchanger to a base pan that is economical to manufacture and maintain, durable, reliable and easy to install and that will not interfere with any other air conditioner manufacturing process.

Other objects will be apparent from the description to follow and from the appended claims.

The preceding objects are achieved according to a preferred embodiment of the invention by providing a clip and screw to secure the heat exchanger to the base pan. The heat exchanger has mounted thereon an end plate containing an opening. The clip is an integral resilient plastic item having two legs formed thereon. Each leg has a flange extending therefrom and the flange converges in a triangular shape to the end of leg to guide the leg into the opening. The body of the clip contains a cylindrical bore and a tapered slit beginning at the bore and tapering outward between the two legs. Bothe the bore and the slit communicate with both ends of the clip. The legs of the clip are inserted through the opening in the end plate and the flanges engage the end plates on the surface of the end plate opposite the surface adjacent to the clip body. A screw is then inserted thru the base pan into the bore of the clip. As the screw is tightened, the legs of the clip expand locking the clip to the end plate and the head of the screw secures the base pan to the clip thereby firmly fastening the heat exchanger to the base pan.

DESCRIPTION OF THE PREFERRED EMBODIMENT

The embodiment of the invention described below is adapted for use in an air conditioning unit for fastening a heat exchanger, either the evaporator coil or condenser coil, to the base pan although it is to be understood that the invention finds like applicability in fastening other air conditioner parts together and in fastening, in general, two articles together.

Figure 1:
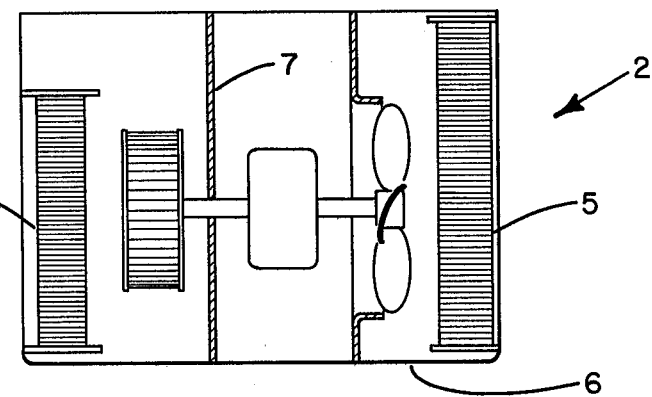
FIG. 1 is a partial schematic top view of a self contained air conditioning unit illustrating the heat exchange coils employed therein.

Referring now to the drawings, FIG. 1 shows in schematic form a self contained air conditioning unit divided into two parts by a partition 7. Contained in the unit and mounted to base pan 6 are evaporator 3 and condenser 5. In the usual air conditioning unit, refrigerant circulates in a conventional cycle between the evaporator, the condenser, a compressor (not shown) and an expansion device (not shown). The evaporator is normally mounted in communication with the room air to be conditioned and the condenser is mounted in communication with the outside air whereby heat is discharged. When in operation, the evaporator is colder than room air and the condenser is warmer than the outside air.

Figure 2:
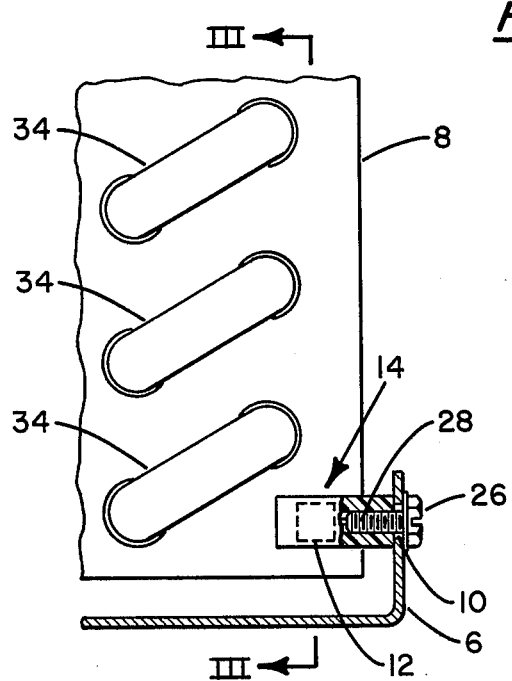
FIG. 2 is a fragmentary sectional view of a heat exchanger mounted to a base pan by means of the apparatus described herein.
Figure 3:
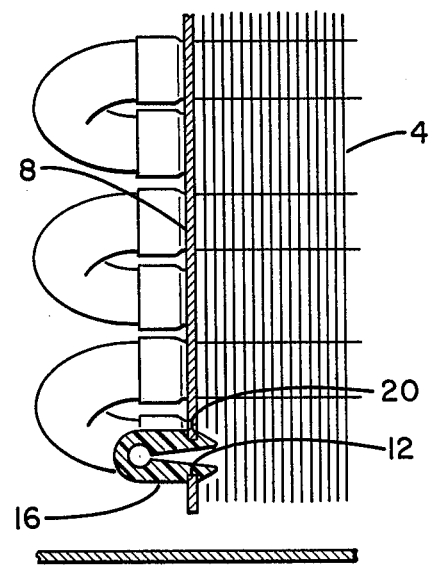
FIG. 3 is a partial sectional side view of FIG. 2 at III-III with a partial cutaway of the heat exchanger fins.
Figure 4:
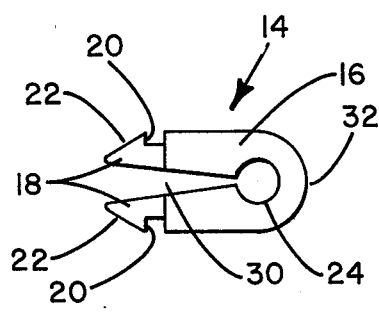
FIG. 4 is an end view of the clip.
Figure 5:
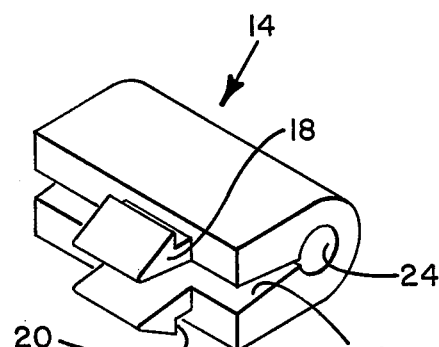
FIG. 5 is a perspective view of the clip.

FIGS. 2-5 illustrate apparatus for fastening an aluminum heat exchanger 4 to a metal base pan 6. In FIG. 2, end plate 8, of the heat transfer coil, has a square opening 12 therethrough. Tubes 34 are shown protruding from end plate 8, said tubes are substantially semicircular and connect the internal tubes of the tube sheet to form a continuous circuit for the refrigerant. Base pan 6 has contained therein screw hole 10, which is sized to be a clearance hole for screw 26. Clip 14 is shown extending from base pan 6 to end plate 8.

Clip 14, made from a resilient and thermally insulative plastic material, is composed of a body 16 and two legs 18. The legs have thereon flanges 20 which converge into triangular shaped ends 22 for guiding the legs thru opening 12 in end plate 8.

A cylindrical bore 24 extends the full length of clip 14 and is connected to tapered slit 30. The slit communicates on one end with bore 30 and on the other end with the exterior of body 16 between the two legs. The interior edge of legs 18 and tapered slit 30 form a plane with the axis of bore 30 and legs 18 extend from the body perpendicular to the bore axis.

The clip is mounted into opening 12 by manually compressing legs 18 together and then inserting the legs, triangular shaped ends 22 first, through opening 12. As the clip and legs move further into opening 12 and after flanges 20 pass entirely through the opening in end plate 8, the compressing force on the clip is released and the clip being resilient returns to its original position. At this point (FIG. 3) flanges 20 engage one surface of end plate 8 and the surface of legs 22 connecting body 16 and flange 20 engages the internal edge of opening 12 holding the clip in place. Furthermore, the width of legs 18 is such that a close fit is formed with the width of opening 12.

A screw 26 is then inserted through screw hole 10 in base pan 6 into bore 24 of clip 14 with the head of the screw engaging one side of base pan 6 and the threads of the screw engaging bore 24 of clip 14 on the opposite side of the base pan. As screw 26 is tightened, the screw threads 28 advance into bore 24, expanding the bore and the clip. Since clip body 16 at the portion of the clip opposite that from where the legs extend is a solid molded part, back of the clip 32, said portion acts as a pivot point so that upon expansion of the bore by the screw threads, legs 22 are forced away from each other toward the edges of opening 12. When the screw is tightened, legs 22 and flanges 20 are locked into opening 12 holding the clip firmly in place. The head of screw 26 when tightened engages base pan 6 to fasten the base pan firmly to clip 14 which is also fastened firmly to the end plate of the heat exchanger, thereby fastening the heat exchanger to the base pan.

The distance between clip body 16 and flange 20 may be designed to be the same as the thickness of end plate 8 thereby providing apparatus which engages one surface of end plate 8 with flange 20, the other surface of end plate 8 with clip body 16 and the edges of opening 12 with legs 22.

It is evident from the above description of the preferred embodiment that the apparatus described herein provides an inexpensive, simple and easy to assemble means of fastening a heat exchanger to the base pan of an air conditioner.

The invention has been described in detail with particular reference to a preferred embodiment thereof, but it will be understood that variations and modifications can be effected within the spirit and scope of the invention.

We claim:

1. In an air conditioning unit having a heat exchanger and a base pan wherein the heat exchanger has an end plate containing an opening; means for fastening the end plate to the base pan including a clip comprising a body portion having legs formed thereon, the outer edge of each leg having a flange thereon for engagement of the material surrounding the end plate opening on the opposite surface of the end plate from the clip body, and the flanges converging to form a triangular shaped end on each leg for guiding the clip leg through the end plate opening and the body of the clip containing a bore communicating with the outside of said clip; and a screw, whereby when the clip legs are inserted through the end plate opening and expanded by the insertion of thescrew through the base pan into the bore, the flanges engage the opposite surface of the end plate and lock the clip to the end plate and the screw holding the clip to the base pan.

2. Apparatus as set forth in claim 1 wherein the clip consists of a resilient material and being formed with cylindrical bore and a tapered slit which is radially disposed to the bore and tapered to widen continuously to the outer edge of the clip between the legs, whereby the legs of the clip may be compressed for insertion through the end plate opening and thereafter as a result of the clips resiliency expand against the material surrounding the opening to hold the clip in position prior to the insertion of the screw.

3. Apparatus as set forth in claim 2 wherein the bore is cylindrical and wherein the plane of the tapered slit edge and the interior leg edge have contained therein the axis of the clip bore.

4. Apparatus as set forth in claim 3 wherein the legs extend from the clip body perpendicular to the axis of the bore.

* * * * *